United States Patent Office 3,652,529
Patented Mar. 28, 1972

3,652,529
METHOD FOR PRODUCING SOLID POLYBUTA-
DIENE CONTAINING MORE THAN 60 PERCENT
1,2-MICROSTRUCTURE
William A. Judy and Morford C. Throckmorton, Akron
Ohio, assignors to The Goodyear Tire & Rubber Company, Akron, Ohio
No Drawing. Filed Apr. 23, 1970, Ser. No. 31,354
Int. Cl. C08d 1/14, 3/06
U.S. Cl. 260—94.3
4 Claims

ABSTRACT OF THE DISCLOSURE

A method is disclosed to produce a polybutadiene containing more than 60 percent of the polymer in a 1,2 microstructure which comprises polymerizing butadiene under solution polymerization conditions, with a catalyst comprising (1) an organoaluminum compound, (2) tungsten oxychloride and (3) a nickel salt of a carboxylic acid or an organo complex compound of nickel in which the mole ratio of aluminum to tungsten is equal to or greater than 1.5/1.

---

This invention is directed to a process which produces a solid polymer which contains more than 60 percent of the polymer in a 1,2 microstructure.

Interest recently has been generated in polymers containing a rather high percentage of their microstructure in a 1,2 configuration. The reason for this is that it has been determined that a polymer, for instance, 1,2-polybutadiene imparts a high co-efficient of friction in the blend of, for instance, high cis 1,4 polybutadiene and oil extended styrene-butadiene rubber copolymers.

Therefore, the object of this invention is to provide a process whereby a polybutadiene may be produced which contains at least 60 percent 1,2-microstructure.

According to the invention, polybutadiene is polymerized under solution polymerization conditions with a catalyst comprising (1) an organoaluminum compound, (2) tungsten oxychloride and (3) a nickel salt of carboxylic acid or organo complex-compounds of nickel in which the mole ratio of aluminum (Al) to tungsten (W) is equal to or greater than 1.5/1.

The first catalyst component is an organoaluminum compound. By the term "organo aluminum compound" is meant any organo aluminum compound responding to the formula:

in which $R_1$ is selected from the group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl. Representative of the compounds responding to the formula set forth above are: diethyl aluminum fluoride, di-n-propyl aluminum fluoride, di-n-butyl aluminum fluoride, diisobutyl aluminum fluoride, dihexyl aluminum fluoride, dioctyl aluminum fluoride, and diphenyl aluminum fluoride. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminium hydride, p-tolyl ethyl aluminium hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organo aluminum hydrides. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorgano aluminum compounds.

The second catalyst component is tungsten oxychloride ($WOCl_4$).

The third catalyst component is the nickel containing compound. The component of the catalyst of this invention which contains nickel may be any organo nickel compound. It is preferred to employ a soluble compound of nickel. These soluble nickel compounds are normally compounds of nickel with a mono- or bidentate organic ligand containing up to 20 carbon atoms. "Ligand" is defined as an ion or molecule bound to and considered bonded to a metal atom or ion. Monodentate means having one position through which covalent or coordinate bonds with the metal may be formed; bidentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organo nickel compounds are nickel benzoate, nickel acetate, nickel naphthenate, nickel octanoate, bis (α-furyl dioxime) nickel, nickel palmitate, nickel stearate, nickel acetylacetonate, nickel salicaldehyde, bis(salicylaldehyde) ethylene diimine nickel and nickel tetracarbonyl. The preferred component containing nickel is a nickel salt of carboxylic acid or an organic complex compound of nickel.

In general, the polymerization is carried out in any inert solvent, and are, thus, solution polymerization. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as —10° C. or below up to high temperatures such as 100° C. or higher. However, it is usually more desirable to employ a more convenient temperature between about 30° C. and about 90° C.

The catalyst concentration employed will, of course, depend on factors such as purity of the polymerization system, the rate desired, the temperature, etc. Those skilled in the art will be able to determine the amount of catalyst required.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at 30° C.

EXAMPLE I

A purified premix of butadiene (Bd) in benzene solution containing 100 grams of butadiene per liter of solution was charged to 4-ounce bottles. Nitrogen was flushed over the surface of the premix and the catalyst charged in situ in the amounts shown in Table 1. The catalyst components and their order of addition were (1) triethylaluminum (TEAL), (2) nickel octanoate (Ni Oct) and (3) tungsten oxytetrachloride ($WOCl_4$). The sealed bottles were tumbled end over end for 43 hours in a 50° °C. water bath.

Experiment Nos. 1 and 2 in Table 1 illustrate conditions whereby solid polymers having 1,2-polybutadiene contents greater than about 60 percent can be prepared. Experiment No. 3 illustrates that polymerization usually does not occur under similar conditions in the absence of the nickel catalyst. At lower Al:W ratios, particularly at higher $WOCl_4$ levels, polymerization may occur in the absence of nickel, but the polymers formed generally are either liquids or undesired low molecular weight polymers under these conditions.

Experiment No. 4 illustrates, that even in the presence of nickel catalyst, that polymers having either low molecular weight or 1,2-polybutadiene content of less than 60 percent, or both, are prepared when the Al:W mole ratio is equal to or less than about 1.3:1.

While certain representative embodiments and details have been shown for the purpose of illustrating the invention, it will be apparent to those skilled in this art that various changes and modifications may be made therein without departing from the spirit or scope of the invention.

What is claimed is:

1. A method for producing solid polybutadiene containing a mixed microstructure and containing about 60 percent to about 78 percent 1,2-microstructure which comprises contacting butadiene under solution polymerization conditions with a catalyst comprising (1) an organoaluminum compound of the formula:

in which $R_1$ is selected from tht group consisting of alkyl (including cycloalkyl), aryl, alkaryl, arylalkyl, hydrogen and fluorine, $R_2$ and $R_3$ being selected from the group of alkyl (including cycloalkyl), aryl, alkaryl, and arylalkyl; (2) tungsten oxychloride and (3) a nickel compound from the group of nickel salts of carboxylic acids and organo complex-compounds of nickel in which the mole ratio of aluminum to tungsten is at least 1.5/1.

TABLE 1

| Exp. No. | Catalyst charge, millimole/100 g. Bd | | | Mole ratio, Al:W | Polymer yield, wt. percent | DSV, dl./g. | Microstructure, percent | | |
|---|---|---|---|---|---|---|---|---|---|
| | TEAL | NiOct | $WOCl_4$ | | | | Cis | Trans | 1,2- |
| 1 | 0.4 | 0.05 | 0.2 | 2 | 46 | 3.2 | 12 | 10 | 78 |
| 2 | 0.8 | 0.10 | 0.4 | 2 | 54 | 1.3 | 16 | 23 | 61 |
| 3 | 0.8 | Nil | 0.4 | 2 | None | | | | |
| 4 | 0.8 | 0.05 | 0.6 | 1.3 | 55 | 0.86 | 24 | 32 | 44 |

EXAMPLE II

The polymerizations illustrated in Example II were conducted at conditions similar to those for Experiment Nos. 1 and 2 in Example I except that a different order of catalyst addition was employed and that the polymerization time was 15 hours. Experiment 1 illustrates that better yields of 1,2-polybutadiene are obtained when the Al:W mole ratio is greater than 1.5:1.

2. The method according to claim 1 in which the organo-aluminum compound is an aluminum trialkyl.

3. The method according to claim 1 in which the nickel compound is a nickel salt of a carboxylic acid.

4. The method according to claim 1 in which the catalyst system comprises triethylaluminum, nickel octanoate and tungsten oxytetrachloride.

TABLE 2

| Exp. No. | Catalyst charge, millimole/100 g. Bd | | | Mole ratio, Al:W | Polymer yield, wt. percent | DSV, dl./g. | Microstructure, percent | | |
|---|---|---|---|---|---|---|---|---|---|
| | NiOct | TEAL | $WOCl_4$ | | | | Cis | Trans | 1,2- |
| 1 | 0.05 | 0.6 | 0.4 | 1.5:1 | 22 | ND | 20 | 8 | 72 |
| 2 | 0.10 | 0.8 | 0.4 | 2.0:1 | 33 | 2.9 | 17 | 8 | 75 |

Note.—ND=not determined.

References Cited

UNITED STATES PATENTS

| | | | |
|---|---|---|---|
| 3,026,269 | 3/1962 | Gresham et al. | 252—429 |
| 3,300,466 | 1/1967 | Marullo et al. | 260—94.3 |
| 3,446,787 | 5/1969 | Throckmorton et al. | 260—94.3 |
| 3,451,987 | 6/1969 | Dawans et al. | 260—94.3 |
| 3,457,250 | 7/1969 | Gaeth | 260—94.3 |
| 3,498,963 | 3/1970 | Ichikawa et al. | 260—94.3 |
| 3,522,332 | 7/1970 | Ichikawa et al. | 260—94.3 |

JOSEPH L. SCHOFER, Primary Examiner

R. A. GAITHER, Assistant Examiner